US009753804B1

(12) United States Patent
Sivertsen et al.

(10) Patent No.: US 9,753,804 B1
(45) Date of Patent: Sep. 5, 2017

(54) MULTI-REDUNDANT DIGITAL SIGNAGE

(71) Applicant: American Megatrends, Inc., Norcross, GA (US)

(72) Inventors: Clas G. Sivertsen, Lilburn, GA (US); Craig Cameron Scott, Cheltenham (AU); Renaud Marc Sauvain, Keelung (TW)

(73) Assignee: American Megatrends, Inc., Norcross, GA (US)

( * ) Notice: Subject to any disclaimer, the term of this patent is extended or adjusted under 35 U.S.C. 154(b) by 256 days.

(21) Appl. No.: 14/175,349

(22) Filed: Feb. 7, 2014

(51) Int. Cl.
G06F 11/00 (2006.01)
G06F 11/14 (2006.01)
H04L 29/06 (2006.01)

(52) U.S. Cl.
CPC .......... G06F 11/1412 (2013.01); H04L 67/42 (2013.01)

(58) Field of Classification Search
CPC ............. G06F 11/2002; G06F 11/2025; G06F 11/2033; G06F 11/1402; G06F 11/1417
USPC ........................................................ 714/4.11
See application file for complete search history.

(56) References Cited

U.S. PATENT DOCUMENTS

| 7,159,234 B1* | 1/2007 | Murphy | G06F 11/2028 |
| | | | 714/11 |
| 8,510,591 B2* | 8/2013 | White | G06F 11/2025 |
| | | | 714/1 |
| 2006/0206748 A1* | 9/2006 | Li | G06F 11/2025 |
| | | | 714/4.1 |
| 2008/0109851 A1* | 5/2008 | Heather | G06Q 30/0603 |
| | | | 725/60 |
| 2009/0217084 A1* | 8/2009 | Ebbert | G06F 3/1454 |
| | | | 714/5.1 |
| 2009/0228738 A1* | 9/2009 | Michaelson | G06F 11/2025 |
| | | | 714/4.1 |
| 2010/0214908 A1* | 8/2010 | Ralev | G06F 11/2025 |
| | | | 370/221 |
| 2012/0079534 A1* | 3/2012 | Huang | G06K 9/3266 |
| | | | 725/37 |
| 2013/0195420 A1* | 8/2013 | Biggs | H04N 9/8205 |
| | | | 386/230 |

* cited by examiner

Primary Examiner — Elmira Mehrmanesh
(74) Attorney, Agent, or Firm — Lee & Hayes, PLLC

(57) ABSTRACT

Technologies are provided for multi-redundant digital signage. A video server computer connected to one or more digital displays is configured to receive one or more videos and content, such as an image or a video, from a content server. A video player application executes on the video server computer to display the video received from the content server on the digital displays. An operating system executing on the video server computer is also configured to present the content as a desktop background. If execution of the video player application fails, the desktop background is presented, thereby displaying the content received from the content server. Additionally, the content may be stored in a non-volatile memory of the one or more digital displays. If a video signal from the video server computer is lost, the digital displays may present the content automatically or in response to a manual user input.

20 Claims, 5 Drawing Sheets

MULTI-REDUNDANT DIGITAL SIGNAGE

BACKGROUND

Digital signage is becoming more and more pervasive. For example, digital signage is now commonly utilized in airports, restaurants, shopping malls, elevators, and many other locations. In certain types of environments, it is critical that the presentation of information by a digital sign is not interrupted, even for a short period of time. For example, some restaurants utilize digital displays to present a menu board showing available menu items and their associated prices. In this type of scenario, the failure to present the menu board for any period of time during business hours might result in lost revenue to the business owner. It may be similarly important in other types of digital signage applications that certain information be presented on a digital sign at all times.

It is with respect to these and other considerations that the various embodiments described below are presented.

SUMMARY

Concepts and technologies are disclosed herein for multi-redundant digital signage. Through an implementation of the various embodiments disclosed herein, pre-defined content, such as an image or a video, can be presented on a digital display even when a video server computer driving the digital display has crashed, when a video player executing on the video server computer configured to present video on the digital display has crashed, when a video cable from the video server computer has been cut or removed, or another condition has occurred that causes the image from the video server computer to become unavailable to a digital display.

According to one aspect disclosed herein, a mechanism is provided for multiple redundant digital signage that is configured to ensure that content, such as an image or a video, is displayed on one or more digital displays, even when there are one or more faults that might otherwise prevent the digital displays from presenting the content. In order to achieve this functionality, one or more video server computers are connected to one or more digital displays. The video server computers are configured to execute a video player application to display video or a static image on the digital displays. The video server computers are also configured to periodically retrieve the video and/or static images from a network-based content server for presentation on the digital displays.

The video server computers are also configured to periodically retrieve content from the content server to be utilized as a desktop background (which might also be referred to as a "desktop wallpaper") for the operating system executing on the video server computer. The content might be an image or even a video when utilized with an operating system capable of presenting a video as a desktop background. The content might include subject matter that is consistent with the video presented on the digital displays. For example, if the video presented on the digital displays is a menu board utilized in a restaurant, the image utilized as the desktop background might also be configured to present all or a portion of the menu board shown in the video.

When the operating system of the video server computer has been launched, but the video player application has not yet been executed, or its execution has failed (i.e. "crashed"), the desktop background will be presented on the digital displays. In this way, content retrieved from a content server can be presented at all times, even when the operating system or video player application executing on the video server computer has crashed.

In order to provide another layer of redundancy, the digital displays might also be configured to directly display content under certain conditions. For example, and without limitation, the video server computer might cause content, such as an image or a video, to be stored in a non-volatile memory of the digital displays. Alternately, a button might be provided on the digital displays which, when selected, cause the displays to capture an on-screen image and to store the image in the non-volatile memory. The content might also be provided to the digital displays for storage in other ways, such as automatic capture at power on or at a set time, on a removable mass storage device connected to the displays, through the side-band signal of a protocol such as the digital visual interface ("DVI"), high-definition multimedia interface ("HDMI") or HDbaseT, or in another manner.

Each display might also be configured with a suitable video player to play the content if the input video signal from the video server computer is lost. The content might be played automatically in response to losing the video signal from the video server computer or in response to a manual user input, such as a user selecting a button on the digital display in order to present the content stored in the non-volatile memory. Utilizing some or all of these mechanisms, a restaurant, an airport, a business, or another type of operation can have a high level of confidence that important content can be displayed either automatically or manually upon an event that would otherwise result in no content being displayed.

The subject matter described herein may also be implemented in a computing system, as an apparatus, or as an article of manufacture such as a computer-readable storage medium. These and various other features as well as advantages will be apparent from a reading of the following detailed description and a review of the associated drawings.

DETAILED DESCRIPTION

Figure 1:
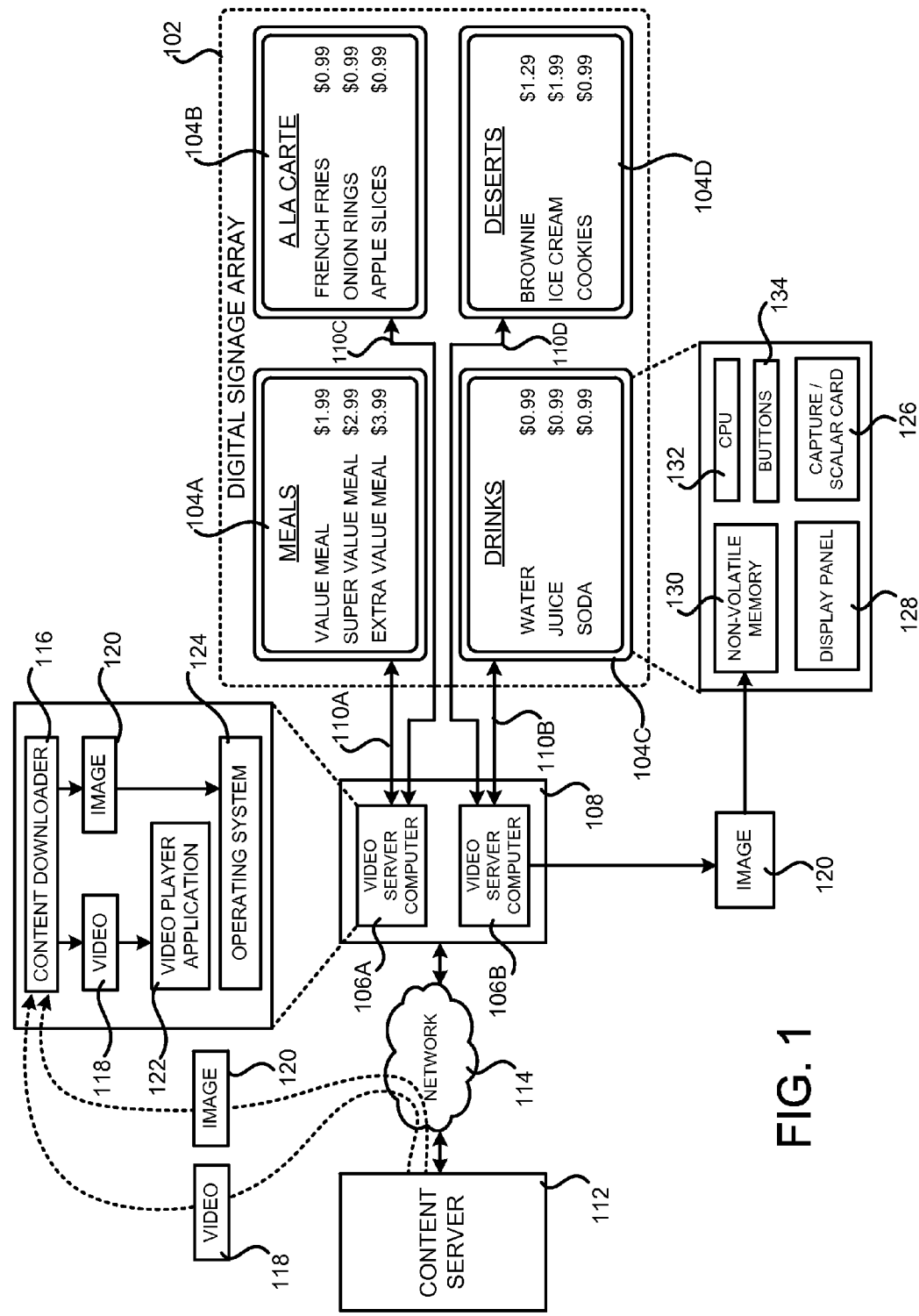
FIG. 1 is a system diagram showing aspects of several software and hardware components utilized in a system disclosed herein for multi-redundant digital signage in one embodiment.

Concepts and technologies are disclosed for multi-redundant digital signage. In the following detailed description, references are made to the accompanying drawings that form a part hereof, and in which are shown by way of illustration specific embodiments or examples. Referring now to the drawings, in which like numerals represent like elements throughout the several figures, aspects of the various implementations provided herein and an exemplary operating environment will be described.

Generally, program modules include routines, programs, components, data structures, and other types of structures that perform particular tasks or implement particular abstract data types. Moreover, those skilled in the art will appreciate that the embodiments described herein may be practiced with other computer system configurations, including handheld devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

FIG. 1 is a system diagram showing aspects of several software and hardware components utilized in a system disclosed herein for multi-redundant digital signage in one embodiment. As shown in FIG. 1, a digital signage array 102 may be configured for utilization in a particular environment. In the example shown in FIG. 1, for instance, a digital signage array 102 has been configured to present a menu board in a restaurant setting. A digital signage array 102 such as that illustrated in FIG. 1 might also be utilized in other environments such as retail, airports, or other types of installations.

In the embodiment shown in FIG. 1, the digital signage array 102 includes four digital displays 104A-104D (which might be referred to collectively as "the digital displays 104" or individually as "a digital display 104") that have been configured in a 2×2 array. It should be appreciated, however, that other configurations of displays might be utilized, such as a single display, a 1×2 array, a 1×3 array, a 1×4 array, or any other configuration. The digital displays 104 may include a display panel 128 that utilizes light emitting diode ("LED") technology, plasma display technology, organic LED technology, liquid crystal display technology, or another display technology. The embodiments disclosed herein are not limited in any way by the type of display technology utilized by the digital displays 104.

As shown in FIG. 1, one or more video server computers 106A and 106B (which might be referred to collectively as "the video server computers 106" or individually as "a video server computer 106") might be utilized to drive the digital displays 104. The video server computers 106 may include a number of conventional computing components such as, but not limited to, a power supply, a motherboard including a central processing unit ("CPU") and random access memory ("RAM)", mass storage devices such as hard drives or solid state drives ("SSDs"), one or more video cards for driving the digital displays 104, and other components known to those skilled in the art. The video server computers 106 might also be stored together in a housing 108 located near the digital displays 104 in one implementation.

The video cards (not shown in FIG. 1) of the video server computers 106 might be connected to the digital displays 104 utilizing suitable connections 110A-110D. For example, and without limitation, the connections from the video cards in the video server computers 106 to the digital displays 104 may be VGA, DVI, HDMI, HDbaseT, LAN/Ethernet, or another suitable connection type. Inside each of the digital displays 104 there is a capture/scalar card 126 that receives a video signal from a video card in a video server computer 106 and processes the received video signal into a format that can be displayed by the display panel 128. Each video server computer 106 might also maintain a data connection to the digital displays 104 such as, but not limited to, an Ethernet connection, an HDbaseT connection, a universal serial bus ("USB") connection or another type of data connection known to those in the art. As will be described in greater detail below, this data connection might be utilized to provide content to the digital displays 104 for local storage and presentation without the use of the video server computers 106.

As shown in FIG. 1, each video server computer 106 is also configured to execute a suitable operating system 124, such as the MICROSOFT WINDOWS operating system or the UBUNTU operating system. Other operating systems might also be utilized. A content downloader application 116 executes on the operating system 124 that is configured to periodically retrieve one or more videos 118 and/or images from a content server 112.

As shown in FIG. 1, the content server 112 is accessible to the video server computers 106 via a data network 114, such as a local area network ("LAN") or a wide area network ("WAN") like the Internet. The content downloader application 116 might periodically poll the content server 112 for updated videos 118 and/or images. Alternately, the content server 112 might push new videos 118 and/or images to the video server computer 106 as they become available.

The content downloader application 116 stores the videos 118 and/or images downloaded from the content server 112 on a local or network accessible storage device that is accessible to a video player application 122, which also executes on the video server computer 106. The video player application 122 is configured to playback the video 118 and/or images received from the content server 112 on the digital displays 104. The video player application 122 might be configured to synchronize playback of different videos and/or images on each of the digital displays 104 connected to the video server computer 106.

The video player application 122 might also play back videos 118 and/or images according to a specified time schedule. In this manner, for example, a video or image showing a breakfast menu might be presented during breakfast hours, while a lunch menu showing lunch items might be presented around lunchtime. Other schedules might also be utilized for the presentation of videos 118 and/or images downloaded from the content server 112.

In order to provide a measure of redundancy in the display of content on the digital displays 104, the content downloader might also be configured to download other content from the content server 112 for use as a desktop background for the video server computers 106. The content might be an image 120 or even a video when utilized with an operating system 124 capable of presenting a video as a desktop background.

As mentioned above, the content in the image 120 or video utilized as the desktop background might include subject matter that is consistent with the video 118 presented on the digital displays 104 during normal operation. For example, if the video 118 presented on the digital displays 104 during normal operation shows a menu board utilized by a restaurant, the image 120 utilized as the desktop background for the operation system 124 might also be configured to present all or a portion of the menu board shown in the video 118. Other content configurations might also be utilized.

When the operating system 124 of each video server computer 106 has been launched, but the video player application 122 has not yet been executed, or the execution of the video player application 122 has failed (i.e. crashed), the image 120 defined as the desktop background will be presented on the digital displays 104. In this way, content such as an image 120 or a video retrieved from the content server 112 can be presented on the digital displays 104 at all times, even when the operating system 124 or video player application 122 executing on a video server computer 106 has crashed. Additional details regarding this mechanism will be described below with regard to FIG. 2.

As mentioned briefly above, another layer of redundancy might also be provided by configuring the digital displays 104 to directly display content, such as an image 120 or a video, under certain conditions. In order to provide this functionality, each digital display 104 might be configured with a CPU 132, a non-volatile memory 130 such as a flash memory, and an image or video player application (not shown in FIG. 1) executing on the CPU 132. In these embodiments, the video server computers 106 might cause content, such as an image 120 or a video, to be stored in a non-volatile memory 130 of the digital displays 104. For example, and without limitation, the side-band connection of an HDbaseT connection between the video server computers 106 and the digital displays 104 might be utilized to periodically load content to the non-volatile memory 130.

In another embodiment, the digital displays 104 are equipped with one or more buttons 134 or other user input mechanisms. In these embodiments, one of the buttons might be provided on the digital displays 104 which, when selected, cause a display 104 to capture an on-screen image (i.e. an image from a video 118 displayed by one of the video server computers 106) and to store the image in the non-volatile memory 130 for later display. An on-screen display ("OSD") or another type of user input mechanism might also be utilized to trigger a digital display 104 to capture and store an on-screen image.

Content might also be provided to the digital displays 104 for storage in the non-volatile memory 130 in other ways, such as through automatic capture at power on of a display 104 or at a preset time, on a removable mass storage device connected to the displays (e.g. an SD card, COMPACT FLASH device, or a USB stick), through the side-band signal of a protocol such as the digital visual interface ("DVI"), high-definition multimedia interface ("HDMI") or HDbaseT, or in another manner.

Once content has been stored locally in the non-volatile memory 130 of the digital displays 104, the content might be presented under certain conditions. In order to enable presentation of the content stored in the non-volatile memory 130, each display 104 might also be configured with a suitable video or image player to play the content if the input video signal from the connected video server computer 106 is lost. For example, and without limitation, the content stored in the non-volatile memory 130 might be played automatically in response to losing the video signal from a video server computer 106 or in response to a manual user input, such as a user selecting one of the buttons 134 on the digital display 104 in order to present the content stored in the non-volatile memory 130. Additional details regarding these processes will be provided below with regard to FIGS. 4 and 5.

Figure 2:
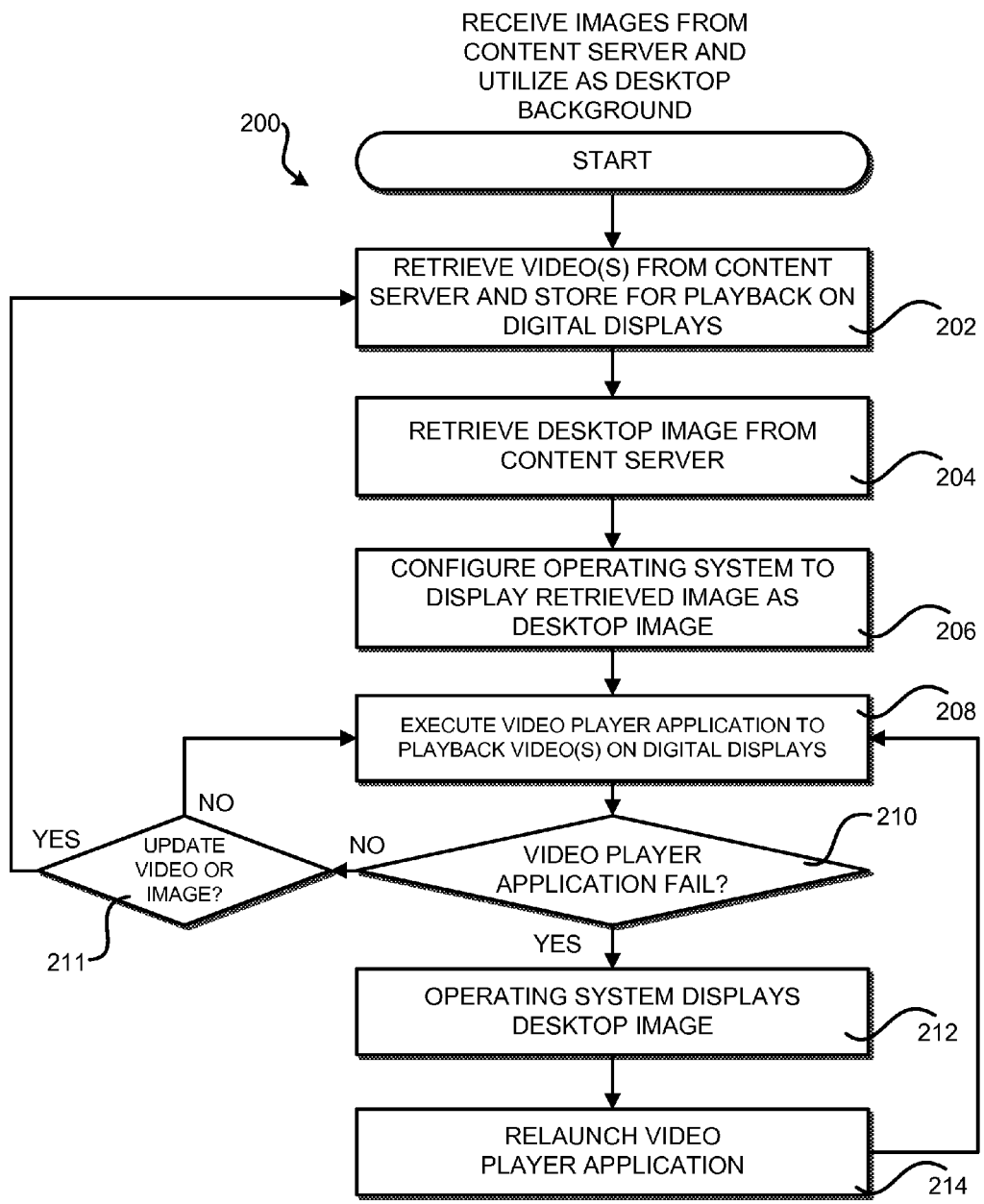
FIG. 2 is a flow diagram showing aspects of an illustrative routine disclosed herein for receiving one or more images from a content server and utilizing the received images as desktop background images in order to provide multi-redundant digital signage in one embodiment disclosed herein.

FIG. 2 is a flow diagram showing aspects of an illustrative routine 200 disclosed herein for receiving one or more images 120 from a content server 112 and utilizing the received images 120 as desktop background images in order to provide multi-redundant digital signage in one embodiment disclosed herein. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the embodiments described herein are implemented. Accordingly, the logical operations making up the implementations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 200 begins at operation 202, where the content downloader application 116 retrieves one or more videos 118 from the content server 112 and stores the downloaded videos 118 in a location that is accessible to the video player application 122. As mentioned above, the content downloader application 116 might download videos 118 from the content server 112 on a pre-defined schedule. Alternately, the videos 118 might be pushed from the content server 112 to the video server computer 106 as new videos become available. Other mechanisms might also be utilized to determine the time at which new videos 118 are to be provided to each video server computer 106.

From operation 202, the routine 200 proceeds to operation 204, where the content downloader application 116 retrieves an image 120 from the content server 112 to be utilized as the desktop background for the operating system 124. Once an image 120 has been retrieved from the content server 112, the routine 200 proceeds to operation 206 where the operating system 124 is configured to utilize the downloaded image 120 as the desktop background. As mentioned above, a video might also be configured for presentation as the desktop background when the operating system 124 is capable of utilizing videos as a desktop background.

Once the image 120, or video, has been configured as the desktop background, the operating system 124 will display the image 120 on one or more of the digital displays 104. Preferably, the operating system 124 will also be configured in order to prevent the display of other graphical user interface objects on the desktop (e.g. mounted hard drives or network shares, documents, or other items) and to prevent the display of any type of menus (e.g. the "start" menu utilized by WINDOWS operating systems or the "dock" utilized by the OSX operating system).

From operation 206, the routine 200 proceeds to operation 208, where the video player application 122 is executed on the video server computers 106 in order to display the video 118 on the digital displays 104. The routine 200 then proceeds from operation 208 to operation 210, where a determination is made as to whether execution of the video player application 122 has failed (i.e. the video player application 122 has "crashed").

If execution of the video player application 122 has not failed, the routine 200 proceeds to operation 211, where a determination is made as to whether the video 118 or the image 120 is to be updated. If the video 118 or the image 120 is to be updated, the routine 200 proceeds from operation 211 back to operation 202, where a new video 118 and/or image 120 might be obtained from the content server 112 in the manner described above. If a new video 118 and/or image 120 is not to be obtained, the routine 200 proceeds from operation 211 back to operation 208 where playback of the video 118 continues.

If, at operation 210, it is determined that execution of the video player application 122 has failed, the routine 200 proceeds from operation 210 to operation 212. At operation 212, any on-screen elements presented by the video player application 122 are removed and the operating system 124 displays the desktop (i.e. the image 120 set as the desktop background at operation 206). In this manner, the image 120 is presented prior to launching the video player application 122 and when execution of the video player application 122 fails.

From operation 212, the routine 200 proceeds to operation 214, where execution of the video player application 122 may be restarted. The routine 200 then proceeds from operation 214 back to operation 208, where the video 118 may be played and updated in the manner described above.

Figure 3A:
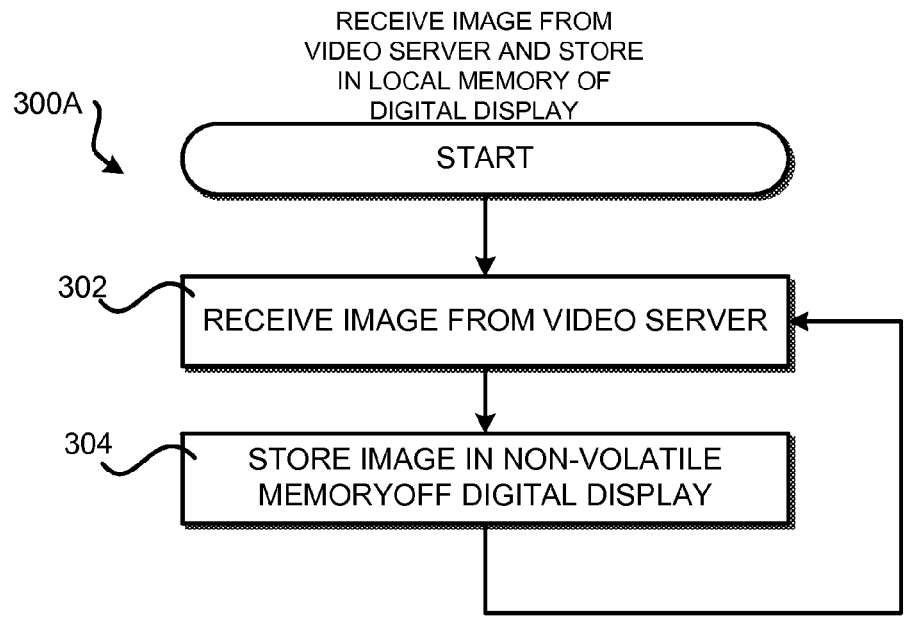
FIGS. 3A and 3B are flow diagrams illustrating aspects of the operation of several mechanisms disclosed herein for obtaining content, such as images or video, and storing the content in a non-volatile memory of a digital display for use in providing multi-redundant digital signage.
Figure 3B:
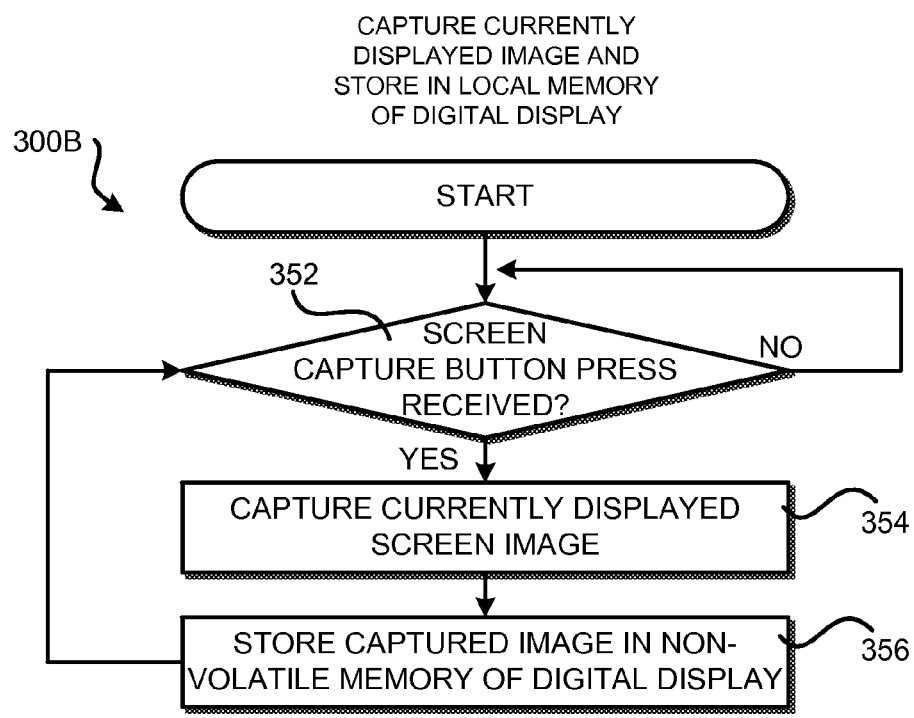

FIGS. 3A and 3B are flow diagrams showing routines 300A and 300B, respectively, illustrating aspects of the operation of several mechanisms disclosed herein for obtaining one or more images 120 and storing the images 120 in a non-volatile memory 130 of a digital display 104 for use in providing multi-redundant digital signage. In particular, the routine 300A shows one mechanism whereby a video server computer 106 provides an image 120 (or a video) to a digital display for storage in a non-volatile memory 130.

The routine 300A begins at operation 302, where a digital display 104 receives an image 120 (or a video) from a video server computer 106. As mentioned above, the image 120 (or video) may be provided to a digital display 104 through the side-band signal of a protocol such as DVI, HDMI or HDbaseT. An image 120 might also be provided through a USB connection or other type of dedicated data connection between the video server computer 106 and a digital display 104.

From operation 302, the routine 300A proceeds to operation 304, where the digital display 104 stores the received image 120 (or video) in its non-volatile memory 130. As will be described in greater detail below, the digital display 104 might display the stored image 120 (or video) under certain conditions, such as when a video signal is unavailable from the connected video server computer 106. From operation 304, the routine 300 proceeds back to operation 302, where additional images 120 (or videos) might be received and stored in the non-volatile memory 130 in a similar manner.

The routine 300B shows another mechanism for storing images 120 in the non-volatile memory 130 of a digital display 104 for use when a video signal is unavailable from a video server computer 106. The routine 300B begins at operation 352, where a determination is made as to whether one of the buttons 134 has been selected that corresponds to an operation for capturing a screen of the video input received from the connected video server computer 106.

If such a button 134 has been selected, the routine 300B proceeds to operation 354, where the capture/scaler card 126 captures an image 120 of the video signal provided by the video server computer 106. The routine 300B then proceeds to operation 356, where the captured image 120 is stored in the non-volatile memory 130 of the digital display. In this way, an image 120 can be captured directly from the input video signal for presentation at a later time when the video signal becomes unavailable. From operation 356, the routine 300B proceeds back to operation 352, where additional images 120 might be captured in the manner described above. As mentioned above, other user input mechanisms such as an OSD might be utilized in order to trigger the capture and storage of a video frame in the non-volatile memory 130.

As mentioned above, other mechanisms might also be utilized to cause content, such as images 120 and/or videos 118, to be stored in the non-volatile memory 130 of a digital display 104. For example, and without limitation, content might also be provided to the digital displays 104 for storage in the non-volatile memory 130 in other ways, such as through automatic capture from the input video signal at power on of the display 104 or at a set time, on a removable mass storage device connected to the displays (e.g. an SD card, COMPACT FLASH device, or a USB stick), or in other ways. Additional details regarding one mechanism disclosed herein for presenting content stored in the non-volatile memory 130 will be described below with regard to FIG. 4.

Figure 4:
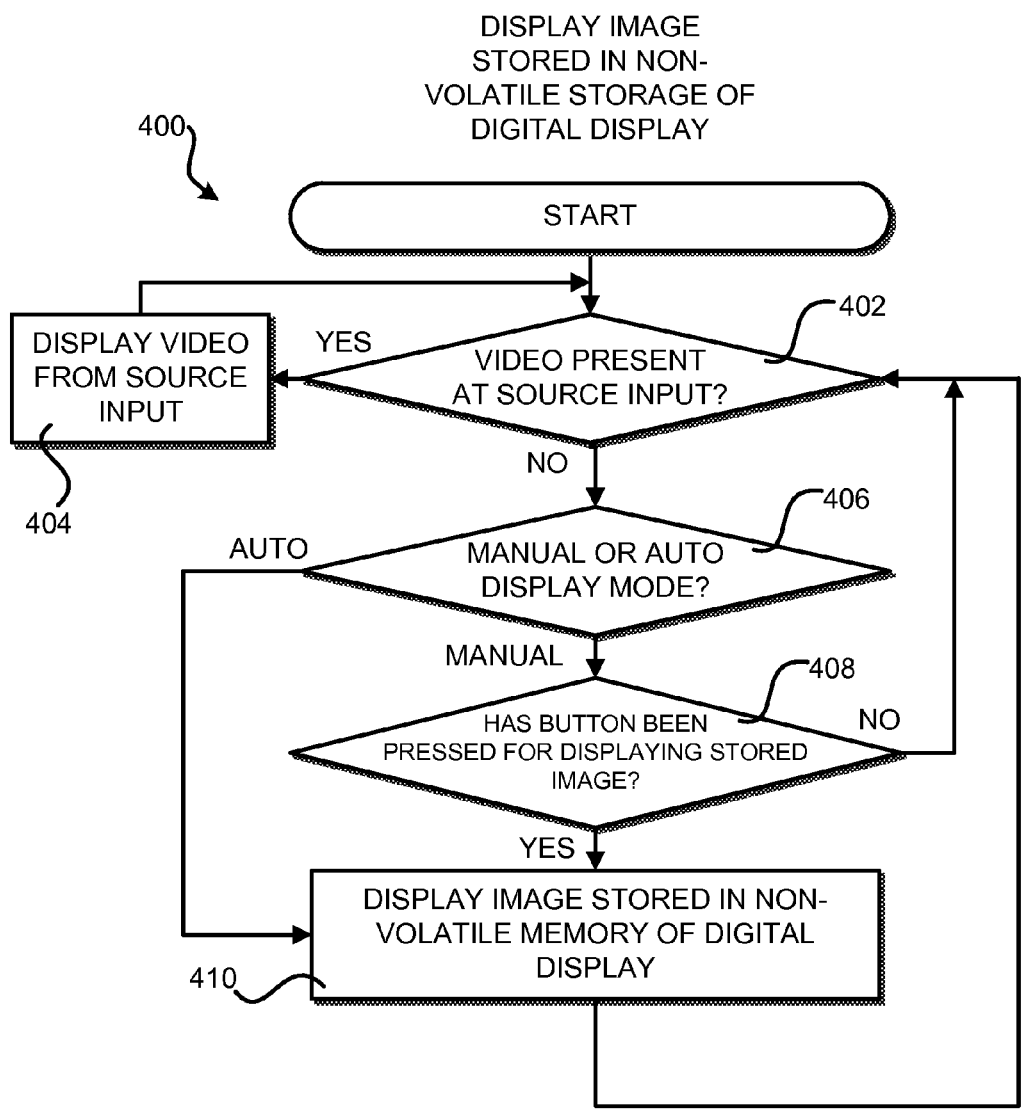
FIG. 4 is a flow diagram showing aspects of one routine disclosed herein for presenting content, such as images or video, stored in a non-volatile memory of a digital display for use in providing multi-redundant digital signage.

FIG. 4 is a flow diagram showing aspects of one routine 400 disclosed herein for utilizing content, such as images 120 or videos, stored in a non-volatile memory 130 of a digital display 104 for use in providing multi-redundant digital signage. The routine 400 begins at operation 402, where a digital display 104 determines whether an input video signal is present from a connected video server computer 106. An input video signal might not be present if the video server computer 106 driving the digital display 104 has crashed, when the video player application 122 executing on the video server computer 106 configured to present video on the digital display 104 has crashed, when a video cable from the video server computer 106 has been cut or removed, or another condition has occurred that causes the video signal from the video server computer 106 to become unavailable to a digital display 104.

If, at operation 402, it is determined that an input video signal is present at the digital display 104, the routine 400 proceeds from operation 402 to operation 404. At operation 404, the digital display 404 presents the input video signal provided by the connected video server computer 106. The routine 400 then proceeds from operation 404 to operation 402, where another determination might be made as to whether an input video signal is present.

If, at operation 402, it is determined that no video input signal is present from the video server computer 106, the routine 400 proceeds from operation 402 to operation 406. At operation 406, the digital display 104 determines whether it has been configured in an automatic display mode or a manual display mode. In the automatic display mode, the digital display 104 automatically presents content from the non-volatile memory 130 in response to detecting the loss of a video signal from the video server computer 106. In the manual display mode, a user must provide a manual input (e.g. selection of one of the buttons 134) in order to cause the digital display 104 to present content from the non-volatile memory 130. The display mode (i.e. automatic or manual) utilized by each digital display 104 might be user configurable, such as through the content server or in another manner.

If the digital display 104 is in the automatic display mode, the routine 400 proceeds from operation 406 to operation 410. At operation 410, the digital display 104 utilizes its internal CPU 132 to automatically display an image 120 (or a video) stored in the non-volatile memory 130. The routine 400 then proceeds to operation 402, described above, where another determination may be made as to whether a video signal from the video server computer 106 is being received.

If the digital display 104 is in the manual display mode, the routine 400 proceeds from operation 406 to operation 408. At operation 408, the digital display 104 determines whether a manual user input (e.g. a press of an appropriate button 134 or an OSD) instructing the digital display 104 to present content stored in the non-volatile memory 130. If such an instruction has been received, the routine 400 proceeds from operation 408 to operation 410, where an image 120 (or a video) stored in the non-volatile memory 130 is displayed using the internal CPU 132 of the digital display 104. If a manual user input instructing the digital display 104 to present an image 120 (or a video) has not been received, the routine 400 proceeds from operation 408 back to operation 402, where another determination may be made as to whether a video signal from the video server computer 106 is currently being received.

Figure 5:
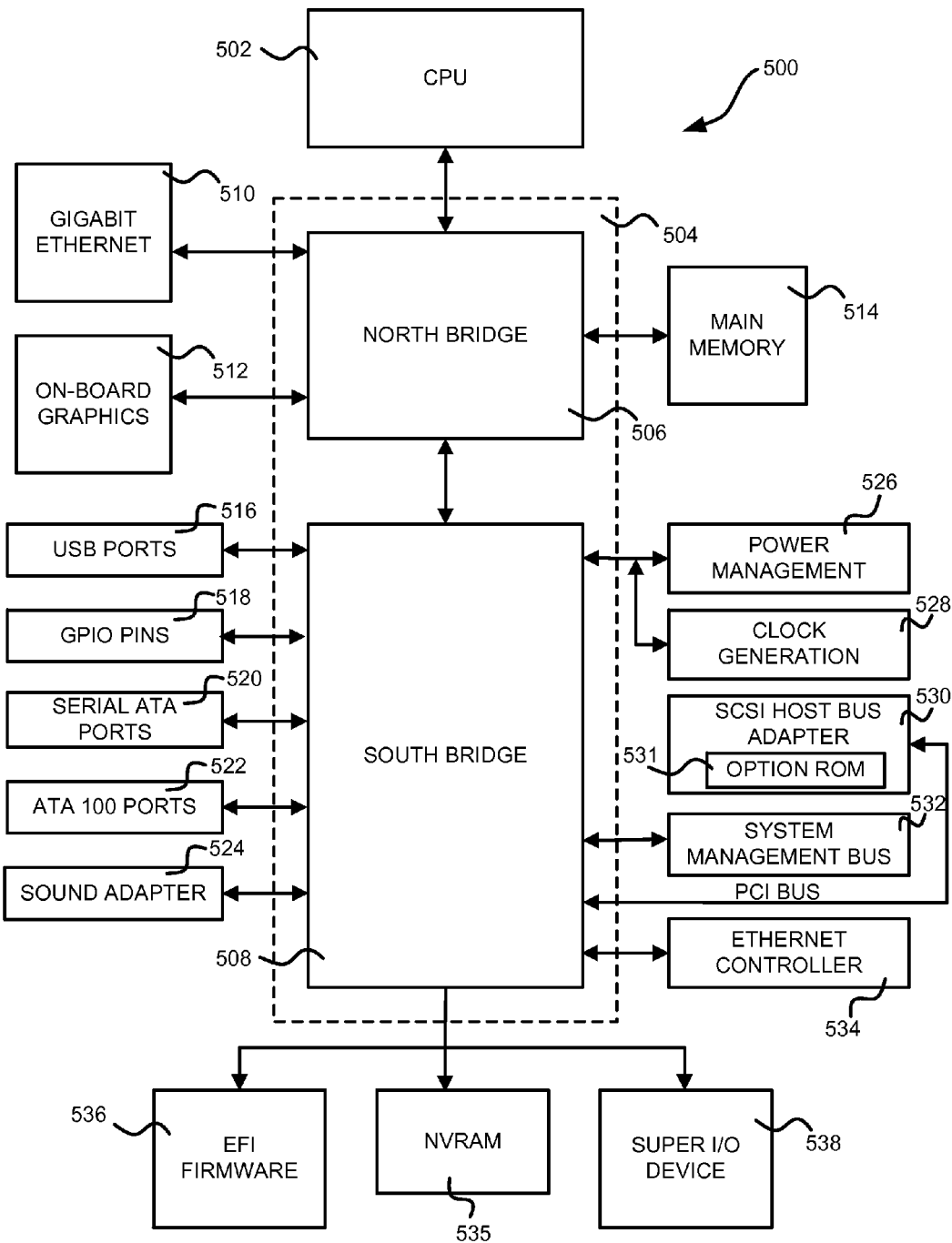
FIG. 5 is a computer architecture diagram that illustrates a configuration for a computer that can be utilized to implement aspects of the various embodiments disclosed herein.

FIG. 5 shows an illustrative computer architecture for practicing aspects of the various embodiments presented herein. It should be appreciated that although the embodiments described herein are discussed in the context of a conventional desktop or server computer, virtually any type of computing device may be utilized. FIG. 5 shows an illustrative computer architecture for a computer 500 that may be utilized to implement various computing systems described herein. For example, and without limitation, the computer 500 might be utilized to implement the content server 112, the video server computers 106A and 106B, and/or any other computing system described herein. An architecture similar to that shown in FIG. 5 might also be utilized to implement aspects of the digital displays 104A-104D. Other computing architectures might also be utilized such as, but not limited to, system on chip ("SOC") architectures, custom architectures, and others.

In order to provide the functionality described herein, the computer 500 includes a baseboard, or "motherboard", which is a printed circuit board to which a multitude of components or devices may be connected by way of a system bus or other electrical communication path. In one illustrative embodiment, a central processing unit ("CPU") 502 operates in conjunction with a chipset 504. The CPU 502 is a standard central processor that performs arithmetic and logical operations necessary for the operation of the computer. As will be described in greater detail below, the computer 500 may include a multitude of CPUs. The CPU 502 may comprise a general purpose microprocessor from INTEL CORPORATION, AMD CORPORATION, ARM HOLDINGS, PLC, or another manufacturer.

The chipset 504 includes a north bridge 506 and a south bridge 508. The north bridge 506 provides an interface between the CPU 502 and the remainder of the computer 500. The north bridge 506 also provides an interface to a random access memory ("RAM") used as the main memory 514 in the computer 500 and, possibly, to an on-board graphics adapter 512. The north bridge 506 may also include functionality for providing networking functionality through a gigabit Ethernet adapter 510. The gigabit Ethernet adapter 510 is capable of connecting the computer 500 to another computer via a network. Connections which may be made by the network adapter 510 may include local area network ("LAN") or wide area network ("WAN") connections. The north bridge 506 is connected to the south bridge 508.

The south bridge 508 is responsible for controlling many of the input/output functions of the computer 500. In particular, the south bridge 508 may provide one or more universal serial bus ("USB") ports 516, a sound adapter 524, an Ethernet controller 534, and one or more general-purpose input/output ("GPIO") pins 518. The south bridge 508 may also provide a bus for interfacing peripheral card devices such as a BIOS boot system compliant SCSI host bus adapter 530. In one embodiment, the bus comprises a peripheral component interconnect ("PCI") bus. The south bridge 508 might also provide a system management bus 532 for use in managing the various components of the computer 500. Power management circuitry 526 and clock generation circuitry 528 may also be utilized during the operation of the south bridge 508.

The south bridge 508 is also operative to provide one or more interfaces for connecting mass storage devices to the computer 500. For instance, according to an embodiment, the south bridge 508 includes a serial advanced technology attachment ("SATA") adapter for providing one or more serial ATA ports 520 and an ATA 100 adapter for providing one or more ATA 100 ports 522. The serial ATA ports 520 and the ATA 100 ports 522 may be, in turn, connected to one or more mass storage devices storing an operating system 124 and application programs such as those described above. As known to those skilled in the art, an operating system 124 comprises a set of programs that control operations of a computer 500, allocation of resources of computer 500, and provide other functions. An application program is software that runs on top of the operating system 124 or other runtime environment.

The mass storage devices connected to the south bridge 508 and the SCSI host bus adapter 530, and their associated computer-readable media, provide non-volatile storage for the computer 500. Although the description of computer-storage media contained herein refers to a mass storage device, such as a hard disk or CD-ROM drive, it should be appreciated by those skilled in the art that computer-storage media can be any available non-transitory media that can be accessed by the computer 500. Computer storage media may include volatile and non-volatile, removable and non-removable media implemented in any method or technology for the non-transitory storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer. As utilized herein, the term computer-readable storage media does not include transitory signals.

A low pin count ("LPC") interface may also be provided by the south bridge 508 for connecting a "Super I/O" device 538. The Super I/O device 538 is responsible for providing a number of input/output ports, including a keyboard port, a mouse port, a serial interface, a parallel port, and other types of input/output ports. The LPC interface might also connect a computer storage media such as a ROM or a flash memory such as a NVRAM 535 for storing EFI firmware 536 that includes program code containing the basic routines that help to start up the computer 500 and to transfer information between elements within the computer 500. The EFI firmware 536 comprises a firmware that is compatible with the EFI or UEFI specifications.

The NVRAM 535 may also be utilized by the firmware 536 to store configuration data and other kinds of data for the computer 500. It should be appreciated that the configuration and other data for the computer 500 may be stored on the same NVRAM device as the EFI firmware 536. It should also be appreciated that the firmware 536 may be a type other than an EFI-compatible firmware. Further, it should be appreciated that the computer 500 may comprise other types of computing devices, including hand-held computers, embedded computer systems, personal digital assistants, and other types of computing devices known to those skilled in the art. It is also contemplated that the computer 500 may not include all of the components shown in FIG. 5, may include other components that are not explicitly shown in FIG. 5, or may utilize an architecture completely different than that shown in FIG. 5.

Based on the foregoing, it should be appreciated that technologies have been described herein provide for multi-redundant digital signage. Moreover, although the embodiments described herein have been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for multi-redundant digital signage, the method comprising:
   receiving, at a video server computer, at least one video and content from a content server;
   configuring an operating system executing on the video server computer to present the content received from the content server as a desktop background for the video server computer;
   executing a video player application on the video server computer to display the at least one video on one or more digital displays connected to the video server computer;
   determining that execution of the video player application has failed; and
   in response to determining that the execution of the video player application has failed, using the content displayed as the desktop background as the display on the one or more digital displays connected to the video server computer.

2. The computer-implemented method of claim 1, further comprising storing the content in a non-volatile memory of the one or more digital displays, and wherein the one or more digital displays are configured to:
   determine whether a video signal from the video server computer is present; and
   in response to determining that the video signal from the video server computer is not present, to display the content stored in the non-volatile memory.

3. The computer-implemented method of claim 2, wherein the content stored in the non-volatile memory is presented automatically in response to determining that the video signal from the video server computer is not present.

4. The computer-implemented method of claim 2, wherein the content stored in the non-volatile memory is presented in response to a manual user input following the determination that the video signal from the video server computer is not present.

5. The computer-implemented method of claim 2, wherein the video server computer is configured to provide the content to the one or more digital displays for storage in the non-volatile memory.

6. The computer-implemented method of claim 2, wherein the one or more digital displays are configured to store the content in the non-volatile memory by capturing an image of a video provided by the video server computer in response to a manual user input.

7. The computer-implemented method of claim 2, wherein the content received from the content server comprises an image.

8. The computer-implemented method of claim 2, wherein the content received from the content server comprises a video.

9. A computer-readable storage medium having stored thereon computer-executable instructions which, when executed by one or more processors, cause a computer to:
   receive, at a video server computer, at least one video and content from a content server;
   configure an operating system executing on the video server computer to present the content received from the content server as a desktop background for the video server computer;
   execute a video player application on the video server computer to display the at least one video on one or more digital displays connected to the video server computer;
   determine that execution of the video player application has failed;
   in response to determining that the execution of the video player application has failed, cause the desktop background to be presented on the one or more digital displays connected to the video server computer; and
   store the content in a non-volatile memory of the one or more digital displays, and wherein the one or more digital displays are configured to determine whether a video signal from the video server computer is present and, in response to determining that the video signal from the video server computer is not present, to display the content stored in the non-volatile memory on the desktop background as the display on the one or more digital displays connected to the video server computer.

10. The computer-readable storage medium of claim 9, wherein the one or more digital displays are further configured to present the content stored in the non-volatile memory automatically in response to determining that the video signal from the video server computer is not present.

11. The computer-readable storage medium of claim 9, wherein the one or more digital displays are further configured to present the content stored in the non-volatile memory in response to a manual user input following the determination that the video signal from the video server computer is not present.

12. The computer-readable storage medium of claim 9, wherein the one or more digital displays are further configured to store the content in the non-volatile memory by capturing an image of a video provided by the video server computer in response to a manual user input.

13. The computer-readable storage medium of claim 9, wherein the video server computer is configured to provide the content to the one or more digital displays for storage in the non-volatile memory.

14. The computer-readable storage medium of claim 9, wherein the content received from the content server comprises an image.

15. The computer-readable storage medium of claim 9, wherein the content received from the content server comprises a video.

16. A system comprising:
a video server computer configured to
receive video and content from a content server,
configure an operating system executing on the video server computer to present the content received from the content server as a desktop background for the video server computer,
execute a video player application on the video server computer to display the at least one video on one or more digital displays connected to the video server computer,
determine that execution of the video player application has failed, and
in response to determining that the execution of the video player application has failed, cause the desktop background to be presented on the one or more digital displays connected to the video server computer; and
the one or more digital displays connected to the video server computer, the one or more digital displays configured to
store the content in a non-volatile memory of the one or more digital displays,
determine whether a video signal from the video server computer is present, and
display the content stored in the non-volatile memory on the desktop background as the display on the one or more digital displays connected to the video server computer in response to determining that the video signal from the video server computer is not present.

17. The system of claim 16, wherein the one or more digital displays are further configured to present the content stored in the non-volatile memory automatically in response to determining that the video signal from the video server computer is not present.

18. The system of claim 16, wherein the one or more digital displays are further configured to present the content stored in the non-volatile memory in response to a manual user input following the determination that the video signal from the video server computer is not present.

19. The system of claim 16, wherein the one or more digital displays are further configured to store the content in the non-volatile memory by capturing an image of a video provided by the video server computer in response to a manual user input.

20. The system of claim 16, wherein the video server computer is further configured to provide the content to the one or more digital displays for storage in the non-volatile memory.

* * * * *